United States Patent
Ramaswamy et al.

(10) Patent No.: US 10,126,209 B2
(45) Date of Patent: Nov. 13, 2018

(54) LIMIT BASED THRESHOLD ESTIMATION FOR PROGNOSTICS AND HEALTH MANAGEMENT

(71) Applicant: Audi AG, Ingolstadt (DE)

(72) Inventors: Sitaram Ramaswamy, West Hartford, CT (US); Mothivel Mummudi Boopathy, Manchester, CT (US)

(73) Assignee: AUDI AG, Ingolstadt (DE)

( * ) Notice: Subject to any disclaimer, the term of this patent is extended or adjusted under 35 U.S.C. 154(b) by 422 days.

(21) Appl. No.: 14/651,181

(22) PCT Filed: Dec. 18, 2012

(86) PCT No.: PCT/US2012/070287
§ 371 (c)(1),
(2) Date: Jun. 10, 2015

(87) PCT Pub. No.: WO2014/098802
PCT Pub. Date: Jun. 26, 2014

(65) Prior Publication Data
US 2015/0346065 A1    Dec. 3, 2015

(51) Int. Cl.
*G06F 11/30* (2006.01)
*G01M 99/00* (2011.01)
(Continued)

(52) U.S. Cl.
CPC ....... *G01M 99/008* (2013.01); *G05B 23/0235* (2013.01); *H01M 8/04992* (2013.01);
(Continued)

(58) Field of Classification Search
CPC ............. G01M 99/008; G05B 23/0235; G05B 2219/2668; H01M 8/04992;
(Continued)

(56) References Cited

U.S. PATENT DOCUMENTS

| | | | |
|---|---|---|---|
| 7,008,708 | B2 | 3/2006 | Edlund et al. |
| 8,603,693 | B2 | 12/2013 | Taniguchi et al. |
| 2002/0020623 | A1 | 2/2002 | Speranza et al. |
| 2002/0037445 | A1 | 3/2002 | Keller et al. |

(Continued)

FOREIGN PATENT DOCUMENTS

| | | |
|---|---|---|
| CN | 201362352 Y | 12/2009 |
| EP | 1 473 789 B1 | 8/2011 |

(Continued)

OTHER PUBLICATIONS

International Search Report, dated Sep. 24, 2013, for International Application No. PCT/US2012/070287, 3 pages.

*Primary Examiner* — Fernando Hidalgo
(74) *Attorney, Agent, or Firm* — Seed IP Law Group LLP

(57) ABSTRACT

According to an embodiment, a method of monitoring the operation of a device includes determining a plurality of operational parameters that are indicative of an operation condition of the device. A difference between each operational parameter and a corresponding limit on that parameter is determined. Each limit indicates a value of the corresponding operational parameter that corresponds to an undesirable operation condition of the device. An action index is determined based on at least a smallest one of the determined differences. A determination is made whether the action index is within a range corresponding to desirable operation of the device.

20 Claims, 1 Drawing Sheet

(51) Int. Cl.
    *H01M 8/04992*     (2016.01)
    *G05B 23/02*     (2006.01)
    *H01M 8/04955*     (2016.01)
    *H01M 8/0432*     (2016.01)
    *H01M 8/04537*     (2016.01)

(52) U.S. Cl.
    CPC ... *G05B 2219/2668* (2013.01); *H01M 8/0432* (2013.01); *H01M 8/04544* (2013.01); *H01M 8/04574* (2013.01); *H01M 8/04955* (2013.01)

(58) Field of Classification Search
    CPC ........... H01M 8/0432; H01M 8/04544; H01M 8/04574; H01M 8/04955
    USPC ........................................................ 702/183
    See application file for complete search history.

(56) References Cited

U.S. PATENT DOCUMENTS

| | | |
|---|---|---|
| 2005/0075750 A1 | 4/2005 | Sun |
| 2010/0015474 A1 | 1/2010 | Dinan et al. |
| 2011/0153035 A1 | 6/2011 | Grichnik et al. |
| 2011/0191076 A1* | 8/2011 | Maeda ............... G05B 23/0254 703/2 |

FOREIGN PATENT DOCUMENTS

| | | |
|---|---|---|
| JP | 8-339203 A | 12/1996 |
| JP | 2006-147239 A | 6/2006 |
| JP | 2006-164781 A | 6/2006 |
| JP | 2007-87856 A | 4/2007 |

* cited by examiner

LIMIT BASED THRESHOLD ESTIMATION FOR PROGNOSTICS AND HEALTH MANAGEMENT

BACKGROUND

A variety of complex device are in widespread use today. Many of those devices have various operating parameters that indicate whether the device is functioning properly or if there may be a problem with the operation of the device. For example, fuel cell systems have specified threshold limits for certain performance variables. For example, there are temperature limits for various portions of a fuel cell system during acceptable operating conditions. There are also limits on output voltage or current for many fuel cell systems.

Significant study has been devoted to prognostics and health management (PHM) and principle component analysis (PCA) for detecting when a device is operating under conditions that depart from an expected or desired operating state. One limitation on such approaches is that the analysis is done with respect to the normal or baseline operation of the device instead of basing the analysis on threshold limits on the operating parameters.

SUMMARY

According to an embodiment, a method of monitoring the operation of a device includes determining a plurality of operational parameters that are indicative of an operation condition of the device. A difference between each operational parameter and a corresponding limit on that parameter is determined. Each limit indicates a value of the corresponding operational parameter that corresponds to an undesirable operation condition of the device. An action index is determined based on at least a smallest one of the determined differences. A determination is made whether the action index is within a range corresponding to desirable operation of the device.

According to an embodiment, a system for monitoring device operation includes a plurality of detectors that provide respective indications of operational parameters that are indicative of an operation condition of the device. The system includes a processor that is configured to determine a difference between each operational parameter and a corresponding limit on that parameter. Each of the limits indicates a value of the corresponding operational parameter that corresponds to an undesirable operation condition of the device. The processor is configured to determine an action index based on at least a smallest one of the determined differences. The processor is configured to determine whether the action index is within a range corresponding to desirable operation of the device.

The various features and advantages of a disclosed example embodiment will become apparent to those skilled in the art from the following detailed description. The drawings that accompany the detailed description can be briefly described as follows.

DETAILED DESCRIPTION

Figure 1:
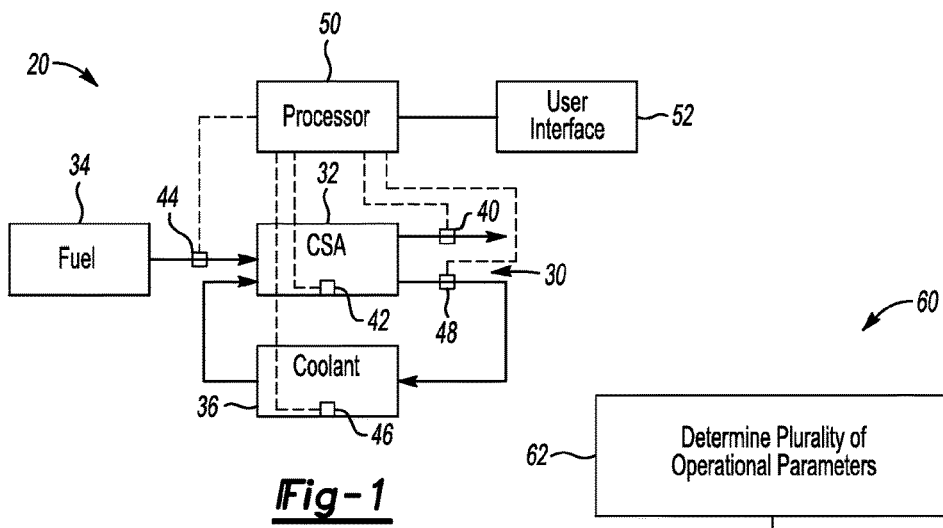
FIG. 1 schematically illustrates a system for monitoring operation of an example device.

FIG. 1 schematically illustrates a system 20 for monitoring operation of a device 30. The disclosed system and method of this description is not necessarily limited to any particular device 30. In the illustrated example, the device 30 comprises a fuel cell power plant. Selected portions of an example fuel cell power plant are illustrated for discussion purposes. A cell stack assembly (CSA) 32 contains a plurality of fuel cells that generate electrical power in a known manner. A source of fuel 34 supplies the CSA 32. A coolant assembly 36 selectively provides coolant for controlling a temperature of the CSA in a known manner.

The system 20 for monitoring operation of the device 30 includes a plurality of sensors or detectors that are situated for detecting a plurality of operational parameters that provide an indication regarding the operation condition of the device 30. In the illustrated example, a temperature sensor 40 provides an indication of a temperature of exhaust from the CSA 32. Another detector 42 provides an indication of a voltage or temperature within the CSA 32. Another detector 44 provides an indication regarding the content or amount of fuel provided by the fuel supply system 34 to the CSA 32. Another detector 46 provides information regarding the coolant system 36 such as information regarding a temperature of the coolant or a concentration of a particular component within the coolant. Another detector 48 provides an indication of coolant temperature exiting the CSA 32.

Given this description, those skilled in the art who are dealing with a particular device of interest will be able to configure a set of detectors to provide the necessary operational parameter information for monitoring the operating condition of the device with which they are dealing. The illustrated detectors are provided for discussion purposes. The disclosed example embodiment is not necessarily limited to any particular device or any particular arrangement of detectors.

A processor 50 collects information from the detectors 40-48 for monitoring the operating condition of the device 30. Based on determinations made by the processor 50, an output is provided to a user through a user interface 52. The output may be a visible or audible alarm or some indication that there is reason to adjust or shutdown operation of the device 30. Depending on the particular device and the conditions that are being monitored, the output provided by the user interface 52 may be customized to meet the needs of a particular situation.

Figure 2:
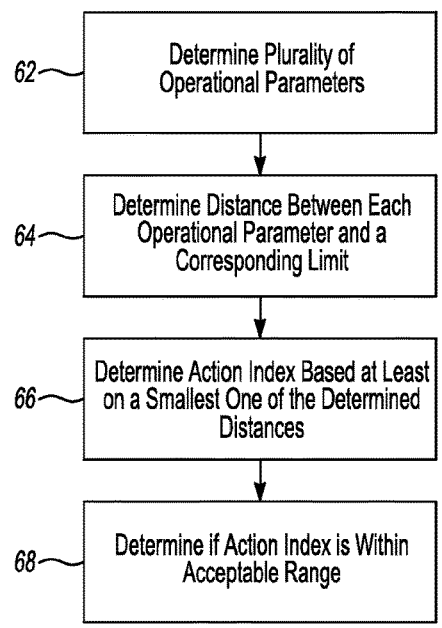
FIG. 2 is a flowchart diagram summarizing an example approach.

FIG. 2 includes a flowchart diagram 60 that summarizes an example approach for monitoring an operating condition of the device 30 in FIG. 1. At 62, a plurality of operational parameters are determined. This occurs by gathering information from the detectors 40-48 and processing them within the processor 50 to place the detector information into a usable form. At 64, a determination is made regarding the distance between each operational parameter and a corresponding limit. In one example, the distance is determined as the Euclidean distance between the operational parameter value indicated by the corresponding detector and a limit that is determined for that particular parameter. In the case of a fuel cell as the example device 30, there are limits on temperature of various components within the device 30. Acceptable limits on temperature are determined based on known information regarding acceptable operation parameters to ensure proper operation of the device 30 and to facilitate achieving a desired lifetime for the device. Given a particular device 30, the particular limits on the operational parameters at issue will either be known or can be determined to meet the needs of a particular situation.

One way in which the disclosed example departs from previous PHM techniques is that the difference or distance between an operational parameter and a limit on that parameter is determined instead of determining how much an observed operation parameter differs from a base line or expected value for that parameter. With the disclosed example, taking into account the distance or difference between the operational parameters and their corresponding limits allows for obtaining an early warning of a condition that may lead to a desire or need to shutdown operation of the device 30. Obtaining an early warning allows for being more proactive in addressing a condition of a device 30 before having to shut it down, for example. Another feature of taking the approach of the disclosed example is that it allows for being more lenient in setting thresholds that place limits on operational parameters. For situations in which a device would be shut down when a limit on a particular parameter is met, those limits must be strictly set to avoid catastrophic failure of the device. Taking the approach of the disclosed example and obtaining an early warning of an operational parameter approaching a limit on that parameter provides more leeway in setting a threshold as it becomes possible to address an operating condition of the device before an absolute threshold on that particular is met.

Once the distance between each operational parameter and its corresponding limit has been determined, the processor 50 determines which of those distances is the smallest. In other words, the processor 50 identifies which of the operational parameters is closest to the limit on that parameter.

At 66, an action index is determined based at least on the smallest one of the determined distances. In one example, the action index comprises a shutdown index. For a situation in which device operation is monitored for purposes of shutting down the device to avoid failure, the action index provides information regarding taking action to shut down the device. There are other possible action indices such as a coolant replacement index, a recharge index, a fuel adjustment index, among many others. A shutdown index is used for an example for discussion purposes.

In one example, the action index is determined based upon modified observation values. Each of the observed operation parameters is modified by combining the observed operational parameter value and a weighted Euclidean distance between that value and the corresponding limit. In other words, the Euclidean distance for each operational parameter is multiplied by a weight and then combined with the observed parameter value. In one example, the weighted Euclidean distance is added to the observed operational parameter value to obtain the modified value.

Determining the smallest of the distances between the operational parameters and their corresponding limits is useful for setting the weighting of the distances for purposes of obtaining modified operational parameter values. In one example, the smallest distance is weighted the most significantly. That way, when the modified operational parameter values are used for determining the action index, the one that is closest to its corresponding limit has the most significant impact on the action index.

In one example, the Euclidean distance that is the smallest of the determined distances receives a weight of approximately one and all other Euclidean distances are weighted with a factor of zero.

The action index is computed in one example using the following relationship $$\text{action index} = (\underline{x}^{SD} - \underline{x}) P \lambda P^T (\underline{x}^{SD} - \underline{x})^T$$

wherein $(\underline{x}^{SD} - \underline{x})$ is a vector matrix of distances between the modified observation values and the corresponding limits on those values; P is a principle component vector matrix containing the normal or expected operation values for each operational parameter; $\lambda$ is a diagonal matrix of principle component Eigen values; $P^T$ is a transpose of the principle component vector matrix; and $(\underline{x}^{SD} - \underline{x})^T$ is a transpose of the vector matrix of the distances between the modified operational parameter values and the corresponding limits on those operation parameters. Further definition of the meaning of P and the topic of principal component analysis approaches can be found in Fault detection and diagnosis in industrial systems, ISBN 1-85233-327-8.

The matrix multiplication operation enabled by the $P \lambda P^T$ term in the equation serves to project the "x" vector onto the principal component subspace. It appropriately rotates and rescales the "x" vector in order to calculate a appropriately scaled action index consistent with the selection of the P principle components. In the absence of such scaling, the risk of multiple false alarms is significantly higher.

In FIG. 2, at 68 a determination is made whether the action index is within an acceptable range. In one example, an appropriate lower limit is placed on the action index. For example, if the index has a value less than 0.1, that is an indication that some action should be taken based upon the current operating condition of the device 30. In an example where the action index is a shutdown index, when the action index has a value that is less than 0.1, that is an indication that the device 30 should be shutdown. The user interface 52 provides an indication indicating that the device 30 should be shutdown in one example. In another example, the processor 50 automatically shuts down the device 30 and the user interface 52 provides an indication that shutdown has occurred. The user interface 52 may also provide information regarding the operational parameter value, the action index value or a combination of them and any other information that would be useful to an individual for troubleshooting operation of the device 30, for example.

Figure 3:
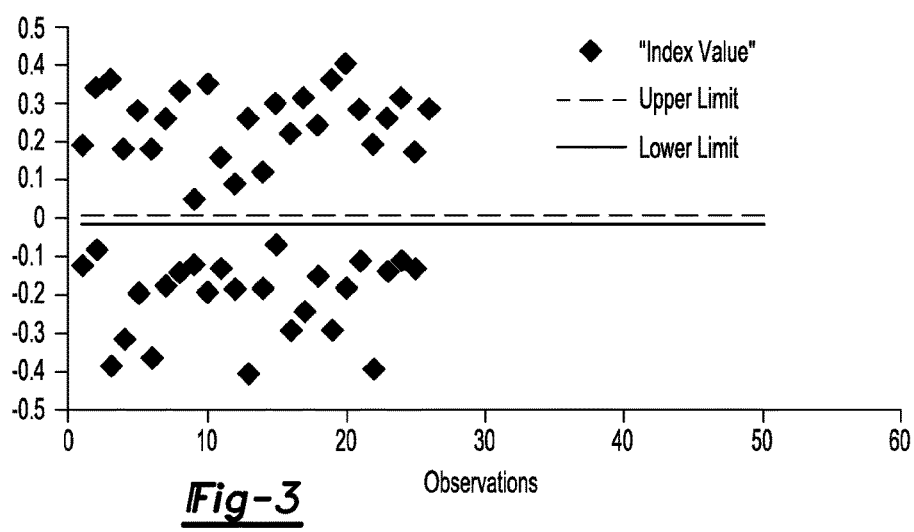
FIG. 3 graphically illustrates a relationship between an action index and the shutdown limits related to the action index.

FIG. 3 schematically shows the upper and lower limit of the action index value. The dashed line 70 indicates the higher action index limit (HAIL) and the solid line 72 indicates the lower action index limit (LAIL). A plurality of index values based on system performance are shown at 74. As long as the action index calculated is outside of the HAIL and LAIL limits, the system is judged as being in control. The actual values of the HAIL and LAIL are determined based on the balance between risk and false alarms associated with the system. Additionally, an escalating alert strategy might be employed depending on how closely the actual action index comes to HAIL and LAIL limits Note that in this case, the action index value of 0 signifies arrival at the shutdown limit.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of operating a fuel cell system, the method comprising:
  receiving, by one or more hardware processors and from a plurality of sensors communicatively coupled to the fuel cell system, sensor information indicative of a plurality of operational conditions of the fuel cell system;

for each of multiple operational parameters associated with the indicated plurality of operational conditions, determining, by the one or more processors and based at least in part on the received sensor information, a difference between an observed value for the operational parameter and a corresponding limit for the operational parameter, the corresponding limit indicating one or more undesirable values for the operational parameter;

generating, by the one or more processors and based at least in part on a smallest one of the determined differences, one or more action indexes for the fuel cell system;

determining, by the one or more processors, whether at least one of the one or more action indexes is not within an acceptable range; and responsive to determining that the at least one action index is not within the acceptable range, initiating, by the one or more processors, one or more corrective actions regarding the fuel cell system.

2. The method of claim 1, wherein determining the difference between the observed value for the operational parameter and the corresponding limit for the operational parameter includes determining a Euclidean distance of the operational parameter from the corresponding limit, and wherein the determined Euclidean distance is the determined difference.

3. The method of claim 2, wherein determining the difference between the observed value for the operational parameter and the corresponding limit for the operational parameter includes determining a square of the Euclidean distance for the operational parameter.

4. The method of claim 2, wherein generating the one or more action indexes includes:
identifying the operational parameter having the smallest determined difference between the observed value and the corresponding limit;
modifying the identified operational parameter by adding a weighted version of the determined Euclidean distance for the identified operational parameter to the observed value for the identified operational parameter; and
determining a modified difference between the modified operational parameter and the corresponding limit.

5. The method of claim 2, wherein generating the one or more action indexes includes:
for each of the multiple operational parameters, modifying the operational parameter by adding a weighted version of the determined Euclidean distance for the operational parameter to the observed value for the operational parameter, and determining a modified difference between the modified operational parameter and the corresponding limit; and
generating a matrix of the modified differences.

6. The method of claim 5, wherein generating the one or more action indexes includes generating a product of:
the matrix of the modified differences;
a principal component vector matrix that includes predetermined operational parameter values corresponding to desirable operation of the fuel cell system;
a diagonal matrix of principal component Eigen values;
a transpose of the principal component vector matrix; and
a transpose of the matrix of the modified differences.

7. The method of claim 2, wherein the at least one action index comprises a shutdown index, wherein determining whether the shutdown index is within the acceptable range includes determining that the shutdown index is not within the acceptable range, and wherein the one or more corrective actions includes initiating a shutdown operation of the fuel cell system.

8. The method of claim 1, wherein determining whether at least one of the one or more action indexes is not within an acceptable range includes:
determining a respective lower limit on an acceptable value for each of the one or more action indexes; and
determining whether any of the one or more action indexes has a value less than the determined respective lower limit.

9. The method of claim 1, wherein determining whether at least one of the one or more action indexes is not within an acceptable range includes:
determining a respective higher limit on an acceptable value for each of the one or more action indexes; and
determining whether any of the one or more action indexes has a value greater than the determined respective higher limit.

10. A hardware device control system, comprising:
a plurality of detectors that provide respective indications of multiple operational parameters that are indicative of one or more operational conditions of a hardware device;
a user interface that, in operation, provides information related to at least one of the one or more operational conditions of the hardware device; and
a hardware processor that is communicatively coupled to the plurality of detectors and to the user interface and that, in operation, performs a method that includes to:
determine, for each of the multiple operational parameters, a difference between an observed value for the operational parameter and a corresponding limit for the operational parameter, wherein the corresponding limit identifies one or more undesirable values for the operational parameter;
generate an action index based at least in part on a smallest one of the multiple determined differences;
determine whether the generated action index is within a defined acceptable range corresponding to desirable operation of the hardware device; and
in response to a determination that the generated action index is not within the defined acceptable range, initiate one or more corrective actions, wherein to initiate the one or more corrective actions includes presenting, via the user interface and one or more electronic signals generated by the hardware processor, an indication that the generated action index is not within the defined acceptable range.

11. The system of claim 10, wherein to determine the difference between the observed value and the corresponding limit includes to determine a Euclidean distance of the observed value from the corresponding limit and wherein the determined Euclidean distance is the determined difference.

12. The system of claim 11, wherein to determine the difference between the observed value and the corresponding limit includes to determine a square of the Euclidean distance for the operational parameter.

13. The system of claim 10, wherein to generate the action index includes to:
identify the operational parameter having the smallest determined difference between the observed value for the operational parameter and the corresponding limit for the operational parameter;

modify the identified operational parameter by adding a weighted version of the determined distance for the identified operational parameter to the observed value for the identified operational parameter; and determine a modified difference between the modified operational parameter and the corresponding limit.

14. The system of claim 13, wherein the method further includes to:

for each of the multiple operational parameters, modify the operational parameter by adding a weighted version of the determined distance for the operational parameter to the observed value for the operational parameter, and determine a modified difference for the operational parameter; and generate a matrix of the modified differences.

15. The system of claim 14, wherein to generate the action index includes to multiply:

the matrix of the modified differences;

a principal component vector matrix;

a diagonal matrix of principal component Eigen values;

a transpose of the principal component vector matrix; and a transpose of the matrix of the modified differences, wherein the principal component vector matrix includes predetermined operational parameter values corresponding to desirable operation of the hardware device.

16. The system of claim 15, wherein the generated action index comprises a shutdown index, and wherein to initiate the one or more corrective actions includes to initiate a shutdown operation of the hardware device.

17. The system of claim 16, wherein to determine whether the generated action index is within the defined acceptable range includes to:

receive an indication of a lower limit on an acceptable value for the action index; and determine that the generated action index is not within the defined acceptable range when the action index has a value less than the lower limit.

18. The system of claim 17, wherein presenting the indication that the generated action index is not within the defined acceptable range includes presenting a user alert in at least one of an audible or visual format.

19. The system of claim 10, wherein to determine whether the generated action index is within the defined acceptable range includes to:

receive an indication of an upper limit on an acceptable value for the action index; and determine that the generated action index is not within the defined acceptable range when the action index has a value greater than the upper limit.

20. A method of operating a fuel system that includes a plurality of sensors, the method comprising:

receiving, by one or more hardware processors and from the plurality of sensors, sensor information indicative of a plurality of operational conditions for the fuel system;

determining, by the one or more hardware processors and based at least in part on the received sensor information, a plurality of operational parameters associated with the indicated plurality of operational conditions;

for each of multiple of the determined operational parameters, determining, by the one or more hardware processors and based at least in part on the received sensor information, a difference between an observed value for the operational parameter and a corresponding limit for the operational parameter, the corresponding limit indicating one or more undesirable values for the corresponding operational parameter;

generating, by the one or more hardware processors and based on a smallest one of the determined differences, one or more action indexes for the fuel system;

determining, by the one or more hardware processors, whether at least one of the one or more action indexes is not within an acceptable range; and responsive to determining that the at least one action index is not within the acceptable range initiating, by the one or more hardware processors, one or more corrective actions regarding the fuel system.

* * * * *